(12) United States Patent
Takeda et al.

(10) Patent No.: US 7,393,803 B2
(45) Date of Patent: Jul. 1, 2008

(54) DIELECTRIC CERAMIC COMPOSITION AND MONOLITHIC CERAMIC CAPACITOR

(75) Inventors: Toshikazu Takeda, Omihachiman (JP); Nobuyuki Wada, Yasu (JP); Yukako Takahashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 11/873,973

(22) Filed: Oct. 17, 2007

(65) Prior Publication Data

US 2008/0045399 A1  Feb. 21, 2008

Related U.S. Application Data

(63) Continuation of application No. PCT/JP2005/021371, filed on Nov. 21, 2005.

(30) Foreign Application Priority Data

Apr. 18, 2005 (JP) .............................. 2005-119999

(51) Int. Cl.
  C04B 35/495 (2006.01)
(52) U.S. Cl. .................... 501/135; 361/321.4
(58) Field of Classification Search ................. 501/134, 501/135; 361/321.4; 252/62.9 R
See application file for complete search history.

(56) References Cited

U.S. PATENT DOCUMENTS

| 3,640,865 | A  | * | 2/1972 | Burns et al. ............. 252/62.9 R |
| 5,954,994 | A  | * | 9/1999 | Kimura et al. .......... 252/62.9 R |
| 7,309,450 | B2 | * | 12/2007 | Nanao et al. ............ 252/62.9 R |
| 2005/0006618 | A1 | * | 1/2005 | Nanao et al. ............ 252/62.9 R |
| 2007/0152183 | A1 | * | 7/2007 | Furukawa et al. ....... 252/62.9 R |
| 2007/0161497 | A1 | * | 7/2007 | Ogiso ........................ 501/134 |

FOREIGN PATENT DOCUMENTS

| JP | 9-165262 | 6/1997 |
| JP | 10-297969 | 11/1998 |
| JP | 11-240759 | 9/1999 |
| JP | 11-278932 | 10/1999 |
| JP | 2002-255639 | 9/2002 |
| JP | 2004-75448 | 3/2004 |

* cited by examiner

*Primary Examiner*—Karl E Group
(74) *Attorney, Agent, or Firm*—Dickstein Shapiro LLP

(57) ABSTRACT

A dielectric ceramic composition of the present invention contains, as a main component, a tungsten-bronze-type composite oxide represented by a composition formula $(K_{1-y}Na_y)Sr_2Nb_5O_{15}$ (wherein $0 \leq y < 0.2$) and, as an auxiliary component, Mn in an amount in the range of 0.1 to 40 parts by mole relative to 100 parts by mole of the main component.

20 Claims, 1 Drawing Sheet

DIELECTRIC CERAMIC COMPOSITION AND MONOLITHIC CERAMIC CAPACITOR

This is a continuation of application Ser. No. PCT/JP 2005/021371, filed Nov. 21, 2005.

TECHNICAL FIELD

The present invention relates to a dielectric ceramic composition and a monolithic ceramic capacitor. More specifically, the present invention relates to a dielectric ceramic composition whose basic composition is $KSr_2Nb_5O_{15}$ having a tungsten-bronze structure, and a monolithic ceramic capacitor including the dielectric ceramic composition.

BACKGROUND ART

A known example of using a composite oxide having a tungsten-bronze structure (hereinafter referred to as "tungsten-bronze-type composite oxide") is as a piezoelectric ceramic for an actuator disclosed in Patent Document 1. This piezoelectric ceramic for an actuator is mainly composed of crystal grains of a tungsten-bronze-type composite oxide represented by a general formula $NaSr_2Nb_5O_{15}$ in which a part of Nb is substituted with V and/or Ta. By substituting a part of Nb with V and/or Ta, the Curie temperature $T_c$ is increased to 150° C. or higher, and at least one of the relative dielectric constant and the electromechanical coefficient ($d_{33}$) are improved.

These piezoelectric characteristics are further improved by substituting a part of Sr in the general formula with an alkaline earth A (at least one element of Mg, Ca and Ba), and in addition, substituting a part of Na with K. Furthermore, Mn and Cu are added as an auxiliary component in an amount in the range of 0.1 to 1.5 weight percent in terms of oxides thereof, thereby improving the sinterability of the piezoelectric ceramic.

Patent Document 1: Japanese Unexamined Patent Application Publication No. 11-240759

DISCLOSURE OF INVENTION

Problems to be Solved by the Invention

However, the tungsten-bronze-type composite oxide represented by a general formula $NaSr_2Nb_5O_{15}$ disclosed in Patent Document 1 relates to piezoelectric ceramic technology but does not relate dielectric ceramics. More specifically, this tungsten-bronze-type composite oxide has a low relative dielectric constant of less than 2,000 and is not suitable for a dielectric ceramic material such as used in a monolithic ceramic capacitor. As described above, the sinterability can be improved by adding Mn but, as shown in Table 2 of Patent Document 1, as the amount of Mn added increases, the relative dielectric constant decreases. Accordingly, it is difficult to use the above tungsten-bronze-type composite oxide as a dielectric ceramic material for a monolithic ceramic capacitor.

The present invention has been conceived in order to solve the above problems. It is an object of the present invention to provide a dielectric ceramic composition and a monolithic ceramic capacitor in which the sinterability can be improved, reduction resistance can be imparted, and the relative dielectric constant can be increased.

Means for Solving the Problems

A dielectric ceramic composition of the present invention contains, as a main component, a tungsten-bronze-type composite oxide represented by the composition formula $(K_{1-y}Na_y)Sr_2Nb_5O_{15}$ (wherein $0 \leq y < 0.2$) and, as an auxiliary component, Mn in an amount in the range of 0.1 to 40 parts by mole relative to 100 parts by mole of the main component.

Another dielectric ceramic composition of the present invention contains, as a main component, a tungsten-bronze-type composite oxide represented by a composition formula $(K_{1-y}Na_y)(Sr_{1-m-n}Ba_mCa_n)_2Nb_5O_{15}$ (wherein $0 \leq y < 0.2$, $0 < m \leq 0.5$, $0 < n \leq 0.5$, and $0 < m+n \leq 0.7$) and, as an auxiliary component, Mn in an amount in the range of 0.1 to 40 parts by mole relative to 100 parts by mole of the main component.

According to a third dielectric ceramic composition of the present invention, the dielectric ceramic composition further contains at least one element selected from Cr, Co, Fe, Ni, Zn, Mg and Si as an auxiliary component, wherein the total content of Mn and the at least one element is more than 0.1 parts by mole and less than or equal to 40 parts by mole relative to 100 parts by mole of the main component.

According to another dielectric ceramic composition of the present invention, 20 mole percent or less of the Nb in the main component is substituted with the auxiliary component.

A monolithic ceramic capacitor of the present invention includes a plurality of stacked dielectric ceramic layers; inner electrodes disposed between the dielectric ceramic layers; and outer electrodes that are electrically connected to the inner electrodes, wherein the dielectric ceramic layers are made of the foregoing dielectric ceramic compositions, and the inner electrodes contain Ni as a main component.

Accordingly, a dielectric ceramic composition (1) of the present invention contains a tungsten-bronze-type composite oxide represented by a composition formula $(K_{1-y}Na_y)Sr_2Nb_5O_{15}$ (wherein $0 \leq y < 0.2$) as a main component. That is, the dielectric ceramic composition (1) of the present invention contains, as a main component, a tungsten-bronze-type composite oxide whose basic composition is $KSr_2Nb_5O_{15}$, and a part of the K site of the basic composition is substituted with Na. The amount y of substitution of Na is less than 20 mole percent ($y<0.2$) relative to 100 mole percent of K. When the amount of substitution of Na is 20 mole percent or more, the relative dielectric constant is decreased, and the effect of the addition of Mn described below may be impaired. In the main component of the present invention, the ratio of sites (1:2:5:15) of the basic composition formula may be somewhat varied as long as the tungsten-bronze structure can be maintained.

A dielectric ceramic composition (2) of the present invention contains, as a main component, a tungsten-bronze-type composite oxide represented by a composition formula $(K_{1-y}Na_y)(Sr_{1-m-n}Ba_mCa_n)_2Nb_5O_{15}$ (wherein $0 \leq y < 0.2$, $0 < m \leq 0.5$, $0 < n \leq 0.5$, and $0 < m+n \leq 0.7$) in which a part of the Sr site of the composition formula $(K_{1-y}Na_y)Sr_2Nb_5O_{15}$ is substituted with barium (Ba) and/or calcium (Ca). By substituting a part of the Sr site of the composition formula $(K_{1-y}Na_y)Sr_2Nb_5O_{15}$ with Ba and/or Ca, for example, the resistivity at a high temperature of about 180° C. can be increased. By increasing the resistivity, a monolithic ceramic capacitor having high reliability even under the high temperatures working condition required for a component for automobile use or the like can be obtained. Each of the amount m of substitution of Ba and the amount n of substitution of Ca is up to 50 mole percent relative to the amount of Sr. However, when the amount of substitution of at least one of Ba and Ca exceeds 50 mole percent, the dielectric ceramic composition may not be sintered as a tungsten-bronze-type composite oxide. When a part of the Sr site is substituted with both Ba and Ca, it is necessary to adjust the total (m+n) of the amounts m and n to 70 mole percent or less relative to the amount of Sr. When the total (m+n) of the amount m of substitution of Ba and the amount n of substitution of Ca exceeds 70 mole percent, the dielectric ceramic composition may not be sintered as a tungsten-bronze-type composite oxide.

Each of the dielectric ceramic compositions (1) and (2) of the present invention contains, as an auxiliary component, Mn in an amount in the range of 0.1 to 40 parts by mole relative to 100 parts by mole of the main component. By adding an amount of Mn to the main component in an amount of the above range, the sinterability of the dielectric ceramic composition (1) can be increased, reduction resistance can be imparted to dielectric ceramic composition (1), the dielectric ceramic composition can be sintered with a base metal, such as Ni, at the same time, and the relative dielectric constant of the tungsten-bronze-type composite oxide can be increased to 2,500 or more. When the content of Mn is less than 0.1 parts by mole, it is difficult to sinter the dielectric ceramic composition at a temperature of 1,200° C. or lower at which a base metal such as Ni can be sintered at the same time. When the content of Mn exceeds 40 parts by mole, the dielectric loss is increased. Consequently, when dielectric ceramic layers of a monolithic ceramic capacitor are formed as described below, the increase in the dielectric loss may cause heat generation during use of the monolithic ceramic capacitor. Even when the dielectric ceramic composition (2) contains Mn in an amount of the above range, the relative dielectric constant of the dielectric ceramic composition (2) tends to be somewhat lower than that of the dielectric ceramic composition (1) because a part of the Sr site is substituted with Ba and/or Ca.

The existing positions of Mn atoms in the dielectric ceramic compositions (1) and (2) of the present invention are not particularly limited. The Mn atoms may be present, for example, in the form of an oxide at grain boundaries of the tungsten-bronze-type composite oxide. Alternatively, the Mn atoms may be present in the form of a solid solution in the tungsten-bronze-type composite oxide.

In addition to Mn, each of the dielectric ceramic compositions (1) and (2) of the present invention preferably contains, as the auxiliary component, at least one element selected from Cr, Co, Fe, Ni, Zn, Mg and Si. These elements have an effect of decreasing the dielectric loss of dielectric ceramic compositions (1) and (2). As in the case of Mn, the existing positions of these elements are not particularly limited. These elements may be present in the form of an oxide at grain boundaries. Alternatively, these elements may be present in the form of a solid solution in the tungsten-bronze-type composite oxide.

The total content of Mn and at least one element selected from Cr, Co, Fe, Ni, Zn, Mg and Si is preferably more than 0.1 parts by mole and 40 parts by mole or less relative to 100 parts by mole of the main component. When the total content of Mn and these elements exceeds 40 parts by mole, the dielectric loss is increased and the resistivity is decreased. When the total content of Mn and these elements is 0.1 parts by mole or less, the dielectric ceramic composition may not be sintered.

In the dielectric ceramic compositions (1) and (2) of the present invention, the auxiliary component containing Mn and other elements may be present in a form in which 20 mole percent or less of Nb in the main component is substituted with Mn and the other elements. When Nb is substituted with the above auxiliary component in an amount of 20 mole percent or less, the relative dielectric constant can be further increased. When the amount of substitution of the auxiliary component for Nb exceeds 20 mole percent, the dielectric loss is increased and the resistivity is decreased.

The dielectric ceramic composition (1) of the present invention can be prepared by, for example, mixing $KSr_2Nb_5O_{15}$ that is synthesized in advance and that is a basic composition of a tungsten-bronze-type composite oxide used as a main component with starting materials such as a carbonate and an oxide for the auxiliary component. The dielectric ceramic composition (2) can be prepared by, for example, mixing a tungsten-bronze-type composite oxide $K(Sr_{1-m-n}Ba_mCa_n)_2Nb_5O_{15}$ that is synthesized in advance and used as a main component with starting materials such as a carbonate and an oxide used as the auxiliary component. Alternatively, the dielectric ceramic compositions (1) and (2) can be prepared by mixing starting materials such as a carbonate and an oxide for synthesizing a tungsten-bronze-type composite oxide for the main component of the dielectric ceramic compositions (1) and (2) with starting materials such as a carbonate and an oxide used for the auxiliary component.

A monolithic ceramic capacitor of the present invention includes dielectric ceramic layers each made of either the dielectric ceramic composition (1) or the dielectric ceramic composition (2) of the present invention and inner electrodes each made of a conductive material that contains a base metal, such as Ni, as a main component. Since a base metal such as Ni is used as an inner electrode material of the monolithic ceramic capacitor of the present invention, the monolithic ceramic capacitor is sintered in a reducing atmosphere. In the present invention, the sintering temperatures of the dielectric ceramic compositions (1) and (2) are decreased to 1,200° C. or lower, and reduction resistance is imparted to the dielectric ceramic compositions since each of the dielectric ceramic compositions (1) and (2) contains Mn. Accordingly, the inner electrode material containing a base metal, such as Ni, as a main component and the dielectric ceramic composition can be sintered at the same time to produce the monolithic ceramic capacitor. A monolithic ceramic capacitor including the dielectric ceramic composition (1) can realize a high relative dielectric constant of 2,500 or more. A monolithic ceramic capacitor including the dielectric ceramic composition (2) can realize a high resistivity at high temperatures. When the dielectric ceramic composition (1) or (2) contains Pb, Bi and the like as impurities, reduction resistance is not exhibited. However, the impurities that are inevitably contained in a trace amount do not impair the reduction resistance.

ADVANTAGES OF THE INVENTION

The present invention can provide a dielectric ceramic composition and a monolithic ceramic capacitor in which the sinterability can be improved, reduction resistance can be imparted, and the relative dielectric constant can be increased. The present invention can provide a dielectric ceramic composition and a monolithic ceramic capacitor in which the sinterability can be improved, reduction resistance can be imparted, and the resistivity at high temperatures can be increased, and which have high reliability even under the high temperatures working conditions a required for a component for automobile use or the like.

Figure 1:
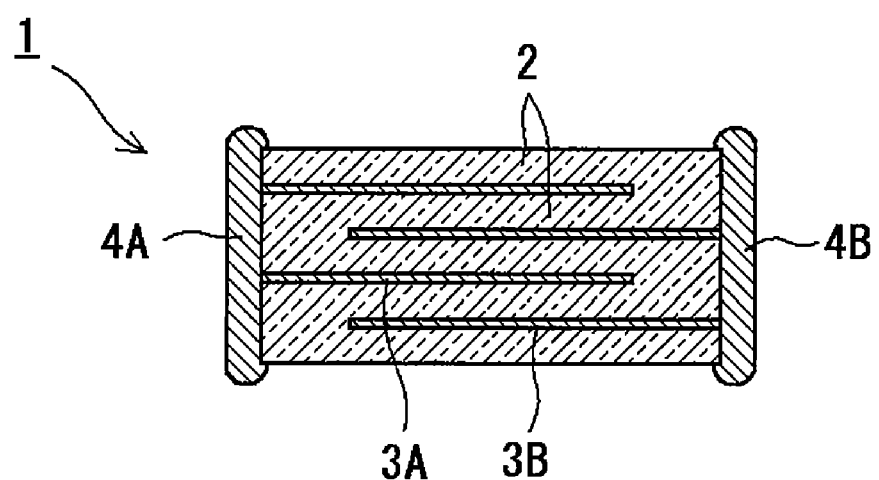
FIG. 1 is a cross-sectional view showing a monolithic ceramic capacitor according to an embodiment of the present invention.

REFERENCE NUMERALS 1 monolithic ceramic capacitor
2 dielectric ceramic layer
3A and 3B inner electrode
4A and 4B outer electrode

BEST MODE FOR CARRYING OUT THE INVENTION

A monolithic ceramic capacitor of the present invention will now be described with reference to, for example, an embodiment shown in FIG. 1. For example, as shown in FIG. 1, a monolithic ceramic capacitor 1 of this embodiment includes a laminate, a first outer electrode 4A and a second outer electrode 4B. The laminate includes a plurality of dielectric ceramic layers 2 (five layers in this embodiment), a plurality of first inner electrodes 3A and second inner electrodes 3B each disposed between dielectric ceramic layers 2. The first outer electrode 4A and the second outer electrode 4B are electrically connected to the first inner electrodes 3A and the second inner electrodes 3B, respectively, and provided at both ends of the laminate.

As shown in FIG. 1, each of the first inner electrodes 3A extends from an end (the left end in the figure) of the dielectric ceramic layers 2 to the vicinity of another end (the right side) thereof. Each of the second inner electrodes 3B extends from the right end of the dielectric ceramic layers 2 to the vicinity of the left end thereof. The first inner electrodes 3A and the second inner electrodes 3B are formed using a conductive material. A conductive material containing a base metal, such as Ni, as a main component can be preferably used as the conductive material. In order to prevent structural defects of the inner electrodes, a small amount of a ceramic powder may be added to the conductive material.

As shown in FIG. 1, the first outer electrode 4A is electrically connected to the first inner electrodes 3A in the laminate, and the second outer electrode 4B is electrically connected to the second inner electrodes 3B in the laminate. The first outer electrode 4A and the second outer electrode 4B can be formed using a known conductive material such as Ag or Cu. The first outer electrode 4A and the second outer electrode 4B can be formed by appropriately employing any known method. For example, a method of applying a Ag paste containing a glass frit and then baking the Ag paste can be employed. Ni—Sn plating may be performed on the baked Ag paste.

EXAMPLES

The present invention will now be described using specific examples.

Example 1

In this example, Mn was added to $KSr_2Nb_5O_{15}$ used as a main component to examine the effect of the content of Mn. More specifically, dielectric ceramic compositions shown in Table 1 were prepared by the procedures described in (1) and (2) below. Monolithic ceramic capacitors of sample Nos. 1 to 23 were then produced by the described procedure using the dielectric ceramic compositions. Subsequently, electrical characteristics of the monolithic ceramic capacitors were evaluated. The evaluation results are shown in Table 1. In Table 1, samples marked with * are those that are out of the range of the present invention.

(1) Preparation of Dielectric Ceramic Raw Materials

A powder of $KSr_2Nb_5O_{15}$ was prepared as a main component of a tungsten-bronze-type composite oxide that was synthesized in advance. In addition, powders of $MnCO_3$, $Cr_2O_3$, $CoCO_3$, $Fe_2O_3$, NiO, ZnO, $MgCO_3$ and $SiO_2$ were prepared as starting materials by an auxiliary component to be added to the main component. The main component and the starting materials of the auxiliary component were weighed and mixed so that the mixed powders had the mixing ratios of sample Nos. 1 to 23 shown in Table 1. Thus, mixed powders were prepared.

(2) Preparation of Samples

Subsequently, a polyvinyl butyral binder and an organic solvent such as ethanol were added to each of the mixed powders for preparing sample Nos. 1 to 23. Each of the mixtures was wet-blended with a ball mill to prepare a ceramic slurry. Each of the ceramic slurries of sample Nos. 1 to 23 was formed into sheets by the doctor blade method to prepare rectangular ceramic green sheets each having a thickness of 8 μm. A conductive paste containing Ni as a main component was printed on each of the ceramic green sheets for each sample to form a conductive paste film for an inner electrode.

Subsequently, as shown in FIG. 1, a plurality of ceramic green sheets for each sample were stacked so that, in each green sheet, the end to which the conductive paste film extended was arranged so as to be opposite those of adjacent green sheets, thus preparing an unfired laminate. The unfired laminates thus obtained were heated in a $N_2$ gas atmosphere at 350° C. to decompose and burn out the binder. The laminates were then sintered at temperatures shown in Table 1 for two hours in a reducing atmosphere containing a mixed gas of $H_2$—$N_2$—$H_2O$ with an oxygen partial pressure in the range of $10^{-9}$ to $10^{-12}$ MPa to prepare sintered laminates. Subsequently, a Ag paste containing a glass frit composed of $B_2O_3$—$SiO_2$—BaO was applied on both end faces of each laminate sample. The Ag paste was then baked at 800° C. in a $N_2$ gas atmosphere to form outer electrodes that were electrically connected to the inner electrodes. Thus, monolithic ceramic capacitors of sample Nos. 1 to 23 were produced. Regarding the outer dimensions of each of the monolithic ceramic capacitors, the width was 3.2 mm, the length was 4.5 mm and the thickness was 0.5 mm. The thickness of each dielectric ceramic layer disposed between the inner electrodes was about 6 μm. The number of effective dielectric ceramic layers was 5, and the area of opposed electrodes per layer was $2.5 \times 10^{-6}$ $m^2$.

(3) Evaluation of Samples

The capacitance C and the dielectric loss tan δ of each sample were measured using an automatic bridge-type measuring device at 25° C., at a frequency of 1 kHz and at 1 Vrms. The relative dielectric constant $\in_r$ was calculated from the measured capacitance C. A DC voltage of 30 V was applied to each sample at 25° C. for one minute and the insulation resistance R was measured using an insulation resistance tester. The resistivity ρ was calculated from the measured insulation resistance. The results are shown in Table 1.

TABLE 1

Main component: $KSr_2Nb_5O_{15}$

| | Auxiliary component [parts by mole] (Relative to 100 parts by mole of main component) | | | | | | | | Sintering temperature [° C.] | Relative dielectric constant $\in r$ | Dielectric loss D.F.[%] | Specific resistance Log ρ Ωm |
|---|---|---|---|---|---|---|---|---|---|---|---|---|
| No. | Mn | Cr | Co | Fe | Ni | Zn | Mg | Si | | | | |
| *1 | — | — | — | — | — | — | — | — | — | Could not be sintered. | | |
| *2 | 0.075 | — | — | — | — | — | — | — | — | Could not be sintered. | | |

TABLE 1-continued

Main component: $KSr_2Nb_5O_{15}$

| | Auxiliary component [parts by mole] (Relative to 100 parts by mole of main component) | | | | | | | | Sintering temperature | Relative dielectric constant | Dielectric loss | Specific resistance Log ρ |
|---|---|---|---|---|---|---|---|---|---|---|---|---|
| No. | Mn | Cr | Co | Fe | Ni | Zn | Mg | Si | [° C.] | ∈r | D.F.[%] | Ωm |
| 3 | 0.100 | — | — | — | — | — | — | — | 1175 | 2600 | 8 | 9.2 |
| 4 | 1.000 | — | — | — | — | — | — | — | 1175 | 3500 | 9 | 9.6 |
| 5 | 3.000 | — | — | — | — | — | — | — | 1175 | 3500 | 9 | 10.5 |
| 6 | 7.000 | — | — | — | — | — | — | — | 1150 | 3800 | 10 | 10.7 |
| 7 | 10.000 | — | — | — | — | — | — | — | 1150 | 3800 | 10 | 10.7 |
| 8 | 20.000 | — | — | — | — | — | — | — | 1150 | 4500 | 12 | 10.6 |
| 9 | 30.000 | — | — | — | — | — | — | — | 1150 | 4700 | 15 | 10.3 |
| 10 | 35.000 | — | — | — | — | — | — | — | 1125 | 4900 | 19 | 9.7 |
| 11 | 40.000 | — | — | — | — | — | — | — | 1125 | 5200 | 23 | 8.3 |
| *12 | 42.000 | — | — | — | — | — | — | — | 1125 | 5300 | 30 | 6.7 |
| *13 | 0.05 | 0.01 | 0.01 | — | — | — | — | — | — | Could not be sintered. | | |
| 14 | 0.10 | 0.1 | — | — | 0.1 | — | — | — | 1175 | 2500 | 8 | 9.4 |
| 15 | 3.00 | — | — | 0.05 | 0.5 | 0.05 | 0.05 | 0.05 | 1175 | 3600 | 9 | 9.8 |
| 16 | 7.00 | 3 | 2 | — | — | — | — | — | 1150 | 3700 | 8 | 10.9 |
| 17 | 7.00 | — | 1 | 1 | 1 | 1 | 2 | 2 | 1150 | 3800 | 8 | 11.1 |
| 18 | 7.00 | — | — | — | — | — | 10 | — | 1150 | 3800 | 8 | 11.1 |
| 19 | 7.00 | — | — | — | — | — | — | 12 | 1150 | 3800 | 7 | 11 |
| 20 | 7.00 | — | — | — | — | — | 12 | 5 | 1150 | 3600 | 6 | 11.4 |
| 21 | 7.00 | — | — | 10 | — | 15 | — | — | 1150 | 3700 | 7 | 11.2 |
| 22 | 7.00 | — | — | — | 8 | — | 10 | 10 | 1150 | 3600 | 6 | 11.3 |
| *23 | 10.00 | 5.00 | 3.00 | 5.00 | 5.00 | 3.00 | 5.00 | 5.00 | 1150 | 5100 | 33 | 6.1 |

Referring to the results shown in Table 1, the inner electrodes containing Ni as a main component in sample Nos. 3 to 11 in which the content of Mn was within the range of the present invention (in the range of 0.1 to 40 parts by mole relative to 100 parts by mole of the main component), could be sintered with the dielectric ceramic layers at the same time at a temperature of 1,200° C. or lower in a reducing atmosphere. Furthermore, sample Nos. 3 to 11 showed excellent dielectric characteristics in which the relative dielectric constant ∈r was 2,500 or more. In sample Nos. 14 to 22 in which the total content of Mn and other elements (at least one element selected from Cr, Co, Fe, Ni, Zn, Mg and Si) of the auxiliary component was in the range of 0.1 to 40 parts by mole relative to 100 parts by mole of the main component, which is within the range of the present invention, the dielectric losses of the samples were lower than those of sample Nos. 3 to 11. In addition, results similar to those of sample Nos. 3 to 11 were obtained in sample Nos. 14 to 22.

In contrast, sample Nos. 1 and 2 in which the content of Mn was lower than the range of the present invention could not be sintered to form dielectric ceramic layers. Sample No. 12 in which the content of Mn exceeded the range of the present invention had a high dielectric loss, 30%, indicating that this sample had a problem functioning as a capacitor. Sample No. 13 in which the total content of Mn and the other elements of the auxiliary component was lower than the range of the present invention could not be sintered into dielectric ceramic layers. Sample No. 23 in which the total content of Mn and the other elements of the auxiliary component was higher than the range of the present invention had the same problem as a capacitor as sample No. 12.

Example 2

In this example, monolithic ceramic capacitors were produced by the same method as that used in Example 1 using dielectric ceramic compositions $KSr_2(Nb_{5-x}A_x)O_{15}$ in which the Nb site of $KSr_2Nb_5O_{15}$, which was a basic composition of a main component, was substituted with an auxiliary component A, such as Mn, shown in Table 2. The monolithic ceramic capacitors were evaluated as in Example 1 to examine the effect of the amount x of substitution of the auxiliary component A in the main component of Example 1. In Table 2, samples marked with * are those that are out of the range of the present invention.

(1) Preparation of Dielectric Ceramic Raw Materials

In this example, powders of $K_2CO_3$, $Nb_2O_5$ and $SrCO_3$ were prepared as starting materials for forming the basic composition $KSr_2Nb_5O_{15}$ of the main component. In addition, powders of $MnCO_3$, $Cr_2O_3$, $CoCO_3$, $Fe_2O_3$, NiO, ZnO, $MgCO_3$ and $SiO_2$ used as starting materials for an auxiliary component A for substituting a part of Nb of the basic composition were prepared. The starting materials of the main component and the starting materials of each auxiliary component A were weighed and mixed so that the mixed powders had the mixing ratios of sample Nos. 31 to 49 shown in Table 2. Thus, mixed powders were prepared. Each of the mixed powders was calcined in air at 1,100° C. for two hours and then pulverized to prepare calcined powders.

(2) Preparation of Samples

Subsequently, as in Example 1, a polyvinyl butyral binder and an organic solvent such as ethanol were added to each of the calcined powders for preparing sample Nos. 31 to 49. Each of the mixtures was wet-blended with a ball mill to prepare a ceramic slurry. Each of the ceramic slurries of sample Nos. 31 to 49 was formed into sheets by the doctor blade method to prepare rectangular ceramic green sheets each having a thickness of 8 μm. A conductive paste containing Ni as a main component was printed on each of the ceramic green sheets for each sample to form a conductive paste film for an inner electrode.

Subsequently, as shown in FIG. 1, a plurality of ceramic green sheets for each sample were stacked so that in each green sheet, the end to which the conductive paste film extended was arranged so as to be opposite those of adjacent green sheets, thus preparing an unfired laminate. The unfired laminates thus obtained were heated in a $N_2$ gas atmosphere at 350° C. to decompose and burn out the binder. The laminates were then sintered at temperatures shown in Table 2 for two hours in a reducing atmosphere containing a mixed gas of $H_2$—$N_2$—$H_2O$ with an oxygen partial pressure in the range of $10^{-9}$ to $10^{-12}$ MPa to prepare sintered laminates. Subsequently, a Ag paste containing a glass frit composed of $B_2O_3$—$SiO_2$—$BaO$ was applied on both end faces of each laminate. The Ag paste was then baked at 800° C. in a $N_2$ gas atmosphere to form outer electrodes that were electrically connected to the inner electrodes. Thus, monolithic ceramic capacitors of sample Nos. 31 to 49 were produced. Regarding the outer dimensions of each of the monolithic ceramic capacitors, the width was 3.2 mm, the length was 4.5 mm and the thickness was 0.5 mm. The thickness of each dielectric ceramic layer disposed between the inner electrodes was about 6 µm. The number of effective dielectric ceramic layers was 5, and the area of opposed electrodes per layer was $2.5 \times 10^{-6}$ m².

(3) Evaluation of Samples

The capacitance C and the dielectric loss tan δ of each sample were measured using an automatic bridge-type measuring device as in Example 1. The relative dielectric constant $\in_r$ was calculated on the basis of the results. The insulation resistance R of each sample was measured using an insulation resistance tester as in Example 1, and the resistivity ρ was then calculated. The results are shown in Table 2.

within the range of the present invention, results similar to those of sample Nos. 32 to 38 were obtained.

In contrast, sample No. 31 in which the amount x of substitution of Mn was lower than the range of the present invention could not be sintered to form dielectric ceramic layers. Sample No. 39 in which the amount x of substitution of Mn exceeded 20 mole percent had a high dielectric loss, more than 30%, indicating that this sample had a problem as a capacitor. Sample No. 49 in which the total amount x of substitution of Mn and the other elements of the auxiliary component exceeded 20 mole percent, which is out of the range of the present invention, had a high dielectric loss, more than 30%, indicating that this sample had a problem as a capacitor.

Example 3

In this example, as shown in Table 3, monolithic ceramic capacitors were produced by the same method as that used in Example 2 using dielectric ceramic compositions $(K_{1-y}Na_y)Sr_2(Nb_{5-x}A_x)O_{15}$ in which the K site of $KSr_2Nb_5O_{15}$, which was the basic composition of a main component, was substituted with Na and the Nb site of $KSr_2Nb_5O_{15}$ was substituted with Mn serving as an auxiliary component A. The monolithic ceramic capacitors were evaluated as in Example 2 to examine the effect of the amount y of substitution of Na in the

TABLE 2

Main component: $KSr_2(Nb_{5-x}A_x)O_{15}$ (x ≤ 1.0)

| | Amount (x) of substitution of A for Nb | | | | | | | | Sintering temperature | Relative dielectric constant | Dielectric loss | Specific resistance Log ρ |
|---|---|---|---|---|---|---|---|---|---|---|---|---|
| No. | Mn | Cr | Co | Fe | Ni | Zn | Mg | Si | [° C.] | εr | D.F.[%] | Ωm |
| *31 | — | — | — | — | — | — | — | — | — | Could not be sintered. | | |
| 32 | 0.050 | — | — | — | — | — | — | — | 1200 | 3200 | 8 | 10.4 |
| 33 | 0.125 | — | — | — | — | — | — | — | 1175 | 3600 | 9 | 10.5 |
| 34 | 0.250 | — | — | — | — | — | — | — | 1150 | 3900 | 10 | 10.6 |
| 35 | 0.375 | — | — | — | — | — | — | — | 1150 | 4000 | 11 | 10.7 |
| 36 | 0.500 | — | — | — | — | — | — | — | 1125 | 4200 | 11 | 10.7 |
| 37 | 0.750 | — | — | — | — | — | — | — | 1100 | 4600 | 15 | 10.3 |
| 38 | 1.000 | — | — | — | — | — | — | — | 1100 | 5200 | 18 | 9.8 |
| *39 | 1.125 | — | — | — | — | — | — | — | 1100 | 5500 | 32 | 7.6 |
| 40 | 0.125 | 0.05 | — | — | 0.05 | — | — | — | 1175 | 3500 | 8 | 10.7 |
| 41 | 0.500 | — | — | 0.05 | 0.05 | 0.05 | 0.05 | 0.05 | 1125 | 4000 | 9 | 11.3 |
| 42 | 0.500 | 0.25 | 0.125 | — | — | — | — | — | 1125 | 3900 | 11 | 10.9 |
| 43 | 0.500 | — | 0.05 | 0.05 | 0.05 | 0.05 | 0.05 | 0.05 | 1125 | 4100 | 8 | 11.2 |
| 44 | 0.500 | — | — | — | — | 0.3 | — | — | 1125 | 4100 | 10 | 11 |
| 45 | 0.500 | — | — | — | — | — | — | 0.3 | 1125 | 4100 | 10 | 11 |
| 46 | 0.500 | — | — | — | — | — | 0.25 | 0.25 | 1125 | 4000 | 9 | 11.2 |
| 47 | 0.500 | — | — | 0.25 | — | 0.25 | — | — | 1125 | 3900 | 7 | 11.3 |
| 48 | 0.500 | — | — | — | 0.1 | — | 0.15 | 0.25 | 1125 | 3900 | 8 | 11.4 |
| *49 | 0.500 | 0.05 | 0.05 | 0.10 | 0.10 | 0.10 | 0.10 | 0.10 | 1150 | 5800 | 35 | 7.8 |

Referring to the results shown in Table 2, sample Nos. 32 to 38 in which the amount x of substitution of Mn for Nb was within the range of the present invention (20 mole percent or less of Nb, i.e., x≦1.0), as in Example 1, exhibited low sintering temperatures i.e., 1,200° C. or lower, and the samples had reduction resistance, a relative dielectric constant $\in_r$ of 2,500 or more, and thus had excellent dielectric characteristics. In sample Nos. 40 to 48 in which the total amount x of substitution of Mn and other elements (at least one element selected from Cr, Co, Fe, Ni, Zn, Mg and Si) of the auxiliary component was 20 mole percent or less, which is K site in the main component of Example 2. In Table 3, samples marked with * are those that are out of the range of the present invention.

(1) Preparation of Dielectric Ceramic Raw Materials

In this example, powders of $K_2CO_3$, $Nb_2O_5$ and $SrCO_3$ were prepared as starting materials for forming a basic composition $KSr_2Nb_5O_{15}$ of a main component. In addition, a powder of $Na_2CO_3$ used as a starting material of an auxiliary component Na for substituting a part of K of the basic composition, and a powder of $MnCO_3$ used as a starting material of an auxiliary component Mn for substituting a part of Nb of the basic composition were prepared. The starting materials of the main component and the starting materials of the auxiliary component were weighed and mixed so that the mixed powders had the mixing ratios of sample Nos. 51 to 59 shown in Table 3. Thus, mixed powders were prepared. Each of the mixed powders was calcined in air at 1,100° C. for two hours and then pulverized to prepare calcined powders.

(2) Preparation of Samples

Subsequently, as in Examples 1 and 2, a polyvinyl butyral binder and an organic solvent such as ethanol were added to each of the calcined powders for preparing sample Nos. 51 to 59. Each of the mixtures was wet-blended with a ball mill to prepare a ceramic slurry. Each of the ceramic slurries of sample Nos. 51 to 59 was formed into sheet by the doctor blade method to prepare rectangular ceramic green sheets each having a thickness of 8 μm. A conductive paste containing Ni as a main component was printed on each of the ceramic green sheets for each sample to form a conductive paste film for an inner electrode.

Subsequently, monolithic ceramic capacitors were produced using the ceramic green sheets for each sample as in Examples 1 and 2. As in the monolithic ceramic capacitors of Examples 1 and 2, each of the monolithic ceramic capacitors had a width of 3.2 mm, a length of 4.5 mm and a thickness of 0.5 mm. The thickness of each dielectric ceramic layer disposed between the inner electrodes was about 6 μm. The number of effective dielectric ceramic layers was 5, and the area of opposed electrodes per layer was $2.5 \times 10^{-6}$ m$^2$.

(3) Evaluation of Samples

The relative dielectric constant $\in_r$, the dielectric loss, and the resistivity ρ of each sample were calculated as in Examples 1 and 2. The results are shown in Table 3.

the samples had reduction resistance, a relative dielectric constant $\in_r$ of 2,500 or more, and thus had excellent dielectric characteristics.

In contrast, sample No. 55 in which the amount y of substitution of Na was 20 mole percent had a low relative dielectric constant $\in_r$ of less than 2,500. This result showed that the presence of Na impaired the effect of the addition of Mn. Sample Nos. 58 and 59 in which the amount y of substitution of Na was more than 20 mole percent each had a low relative dielectric constant $\in_r$ of less than 2,500, as in sample No. 55. These results showed that the presence of Na impaired the effect of the addition of Mn.

Example 4

In this example, instead of the main component KSr$_2$Nb$_5$O$_{15}$ of Example 1, a tungsten-bronze-type composite oxide K(Sr$_{1-m-n}$Ba$_m$Ca$_n$)$_2$Nb$_5$O$_{15}$ in which a part of the Sr site of the main component of Example 1 was substituted with Ba and/or Ca was prepared as a main component to examine the effect of the amount m of substitution of Ba and/or the amount n of substitution of Ca in the dielectric ceramic compositions of Example 1. In this example, dielectric ceramic compositions shown in Table 4 were prepared as described in Example 1. Monolithic ceramic capacitors of sample Nos. 101 to 127 were prepared using the dielectric ceramic compositions as in Example 1. Subsequently, electrical characteristics of the monolithic ceramic capacitors were evaluated. The evaluation results are shown in Table 4. In Table 4, samples marked with * are those that are out of the range of the present invention.

(1) Preparation of Dielectric Ceramic Raw Materials

Powders of K(Sr$_{1-m-n}$Ba$_m$Ca$_n$)$_2$Nb$_5$O$_{15}$ were prepared as main components of tungsten-bronze-type composite oxides

TABLE 3

Main component: (K$_{1-y}$Na$_y$)Sr$_2$(Nb$_{5-x}$A$_x$)O$_{15}$ (0 ≤ y < 0.2, 0.05 ≤ x ≤ 0.2)

| No. | K 1 − y | Na y | Amount (x) of substitution of A for Nb | | | | | | | | Sintering temperature [° C.] | Relative dielectric constant εr | Dielectric loss D.F.[%] | Specific resistance Log ρ Ωm |
|---|---|---|---|---|---|---|---|---|---|---|---|---|---|---|
| | | | Mn | Cr | Co | Fe | Ni | Zn | Mg | Si | | | | |
| 51 | 0.95 | 0.05 | 0.500 | — | — | — | — | — | — | — | 1150 | 4000 | 10 | 10.7 |
| 52 | 0.9 | 0.1 | 0.500 | — | — | — | — | — | — | — | 1150 | 3600 | 10 | 10.6 |
| 53 | 0.85 | 0.15 | 0.500 | — | — | — | — | — | — | — | 1150 | 3200 | 8 | 10.7 |
| 54 | 0.81 | 0.19 | 0.500 | — | — | — | — | — | — | — | 1150 | 2800 | 7 | 10.8 |
| *55 | 0.8 | 0.2 | 0.500 | — | — | — | — | — | — | — | 1150 | 2400 | 6 | 10.8 |
| 56 | 0.85 | 0.15 | 0.250 | — | — | — | — | — | — | — | 1150 | 3300 | 9 | 10.6 |
| 57 | 0.85 | 0.15 | 0.750 | — | — | — | — | — | — | — | 1125 | 3100 | 8 | 10.5 |
| *58 | 0.7 | 0.3 | 0.250 | — | — | — | — | — | — | — | 1150 | 2200 | 9 | 10.5 |
| *59 | 0.5 | 0.5 | 0.750 | — | — | — | — | — | — | — | 1125 | 2000 | 8 | 10.6 |

Referring to the results shown in Table 3, the sintering temperatures of sample Nos. 51 to 54 in which the amount x of substitution of Mn for Nb was 10% (x=0.500), which is within the range of the present invention, and the amount y of substitution of Na for K was less than 20 mole percent, were low, i.e., 1,200° C. or lower, and the samples had reduction resistance, a relative dielectric constant $\in_r$ of 2,500 or more, and thus had excellent dielectric characteristics. Furthermore, as long as the amount y of substitution of Na was within the range of the present invention (less than 20 mole percent), even when the amount x of substitution of Mn was varied within the range of the present invention, the sintering temperatures of the samples were low, i.e., 1,200° C. or lower, and that were synthesized in advance. In addition, powders of MnCO$_3$, Cr$_2$O$_3$, CoCo$_3$, Fe$_2$O$_3$, NiO, ZnO, MgCO$_3$ and SiO$_2$ were prepared as starting materials an auxiliary component to be added to the main components. The main components and the starting materials of the auxiliary component were weighed and mixed so that the mixed powders had the mixing ratios of sample Nos. 101 to 127 shown in Table 4. Thus, mixed powders were prepared.

(2) Preparation of Samples

Subsequently, as in Example 1, a polyvinyl butyral binder and an organic solvent such as ethanol were added to each of the calcined powders for preparing sample Nos. 101 to 127. Each of the mixtures was wet-blended with a ball mill to prepare a ceramic slurry. Each of the ceramic slurries of sample Nos. 101 to 127 was formed into sheets by the doctor blade method to prepare rectangular ceramic green sheets each having a thickness of 8 μm. A conductive paste containing Ni as a main component was printed on each of the ceramic green sheets for each sample to form a conductive paste film for an inner electrode.

Subsequently, the monolithic ceramic capacitors of sample Nos. 101 to 107 were produced as in Example 1 using the noted ceramic green sheets for each sample. The outer dimensions of each of the monolithic ceramic capacitors were the same as those of Example 1. Specifically, the width was 3.2 mm, the length was 4.5 mm, the thickness was 0.5 mm and the thickness of each dielectric ceramic layer disposed between the inner electrodes was about 6 μm. The number of effective dielectric ceramic layers was 5, and the area of opposed electrodes per layer was $2.5 \times 10^{-6}$ m$^2$.

(3) Evaluation of Samples

The relative dielectric constant $\in_r$, the dielectric loss, and the resistivity ρ of each sample were determined as in Example 1. The results are shown in Table 4. However, in this example, not only an insulation resistance R at 25° C. but also an insulation resistance R at 180° C. was measured. The resistivity ρ were calculated from the corresponding insulation resistances R measured at 25° C. and 180° C. The results are shown in Table 4.

Referring to the results shown in Table 4, sample Nos. 102 to 110, Nos. 114 to 118, Nos. 120 to 122, and Nos. 124 to 126 in which the content of Mn was within the range of the present invention (in the range of 0.1 to 40 parts by mole relative to 100 parts by mole of the main component) and the amount m of substitution of Ba for Sr and the amount n of substitution of Ca for Sr were within the range of the present invention ($0 \leq m \leq 0.5$, $0 \leq n \leq 0.5$, and $0 \leq m+n \leq 0.7$), had high resistivity ρ even at a high temperature of 180° C., although the relative dielectric constants $\in_r$ of these samples were somewhat lower than those in Example 1, and thus reliability at high temperatures was improved. Furthermore, the same advantages as those in Example 1 were obtained.

In contrast, regard sample Nos. 101 and 113 in which the content of Mn was lower than the range of the present invention, could not be sintered into dielectric ceramic layers as in the case of Example 1, although the amount m of substitution of Ba, the amount n of substitution of Ca, and the total (m+n) of these amounts were within the range of the present invention. Sample No. 111 in which the total (m+n) of the amounts of substitution of Ba and Ca exceeded the range of the present invention, sample No. 123 in which the amount m of substitution of only Ba exceeded the range of the present invention, and sample No. 127 in which the amount n of substitution of only Ca exceeded the range of the present invention could not be sintered into dielectric ceramic layers, though the content

TABLE 4

Main component: $K(Sr_{1-m-n}Ba_mCa_n)_2Nb_5O_{15}$
$0 < m \leq 0.5$, $0 < n \leq 0.5$, $0 < m + n \leq 0.7$, $0.1 < Mn + Cr, Co, Fe, Ni, Zn, Mg, Si \leq 40$

| No. | m | n | Mn | Cr | Co | Fe | Ni | Zn | Mg | Si | Sintering temperature [° C.] | Relative dielectric constant εr | Dielectric loss D.F.[%] | Specific resistance Log ρ at 25° C. Ωm | Specific resistance Log ρ at 180° C. Ωm |
|---|---|---|---|---|---|---|---|---|---|---|---|---|---|---|---|
| *101 | 0.1 | 0.1 | — | — | — | — | — | — | — | — | — | — | — | — | — |
| 102 | — | — | 0.2 | — | — | — | — | — | — | — | 1175 | 2700 | 8 | 9.3 | 5.6 |
| 103 | 0.01 | 0.01 | 0.1 | — | — | — | — | — | — | — | 1175 | 2600 | 8 | 9.6 | 6.2 |
| 104 | 0.1 | 0.05 | 0.2 | — | — | — | — | — | — | — | 1150 | 2400 | 7 | 10.2 | 6.6 |
| 105 | 0.2 | 0.1 | 0.1 | — | — | — | — | — | — | — | 1150 | 2200 | 7 | 10.7 | 6.9 |
| 106 | 0.2 | 0.4 | 1 | — | — | — | — | — | — | — | 1150 | 1800 | 6 | 11.9 | 7.7 |
| 107 | 0.3 | 0.4 | 5 | — | — | — | — | — | — | — | 1125 | 1900 | 6 | 11.8 | 7.6 |
| 108 | 0.1 | 0.1 | 10 | — | — | — | — | — | — | — | 1125 | 2700 | 10 | 10.0 | 6.5 |
| 109 | 0.4 | 0.1 | 30 | — | — | — | — | — | — | — | 1100 | 2900 | 12 | 10.8 | 7.0 |
| 110 | 0.3 | 0.4 | 40 | — | — | — | — | — | — | — | 1100 | 1900 | 7 | 12.0 | 7.8 |
| *111 | 0.5 | 0.3 | 1 | — | — | — | — | — | — | — | Could not be sintered. | — | — | — | — |
| *112 | 0.1 | 0.5 | 42 | — | — | — | — | — | — | — | 1100 | 2600 | 38 | 7.1 | Could not be measured. |
| *113 | 0.1 | 0.1 | 0.05 | 0.01 | — | — | — | — | 0.01 | — | Could not be sintered. | — | — | — | — |
| 114 | 0.2 | 0.1 | 0.1 | — | — | — | 0.1 | — | — | 0.1 | 1150 | 2200 | 9 | 10.5 | 6.8 |
| 115 | 0.2 | 0.4 | 1 | — | 1 | — | — | 1 | — | — | 1150 | 1800 | 7 | 11.8 | 7.6 |
| 116 | 0.1 | 0.1 | 5 | 5 | — | — | — | — | — | — | 1125 | 2900 | 11 | 9.9 | 6.4 |
| 117 | 0.1 | 0.1 | 10 | — | — | 10 | — | — | — | — | 1125 | 3300 | 14 | 9.6 | 6.2 |
| 118 | 0.2 | 0.4 | 30 | — | — | 5 | 5 | — | — | — | 1100 | 2500 | 8 | 11.7 | 7.5 |
| *119 | 0.3 | 0.4 | 30 | 5 | 5 | — | — | 5 | — | — | 1100 | 2000 | 42 | 6.9 | Could not be measured. |
| 120 | 0.01 | — | 0.5 | — | — | — | — | — | — | — | 1150 | 2600 | 7 | 9.6 | 6.2 |
| 121 | 0.2 | — | 0.5 | — | — | — | — | — | — | — | 1150 | 2400 | 7 | 10.3 | 6.7 |
| 122 | 0.4 | — | 0.5 | — | — | — | — | — | — | — | 1150 | 2100 | 6 | 11.3 | 7.3 |
| *123 | 0.6 | — | 1 | — | — | — | — | — | — | — | Could not be sintered. | — | — | — | — |
| 124 | — | 0.01 | 0.5 | — | — | — | — | — | — | — | 1150 | 2600 | 8 | 9.5 | 6.2 |
| 125 | — | 0.1 | 0.5 | — | — | — | — | — | — | — | 1150 | 2500 | 7 | 10.0 | 6.5 |
| 126 | — | 0.5 | 0.5 | — | — | — | — | — | — | — | 1150 | 1800 | 6 | 11.5 | 7.5 |
| *127 | — | 0.6 | 1 | — | — | — | — | — | — | — | Could not be sintered. | — | — | — | — |

Could not be sintered.

of Mn of these samples was within the range of the present invention. In sample No. 112 in which the content of Mn exceeded the range of the present invention and sample No. 119 in which the total content of Mn and other elements of the auxiliary component A exceeded the range of the present invention, as in the case of Example 1, the dielectric losses were high, the resistivity at 25° C. were low, and the resistivity ρ at 180° C. could not be measured, even though the amount m of substitution of Ba, the amount n of substitution of Ca, and the total (m+n) of these amounts were within the range of the present invention.

Example 5

In this example, monolithic ceramic capacitors were produced as in Example 2 using, instead of the main component $KSr_2(Nb_{5-x}A_x)O_{15}$ of Example 2, dielectric ceramic compositions $K(Sr_{1-m-n}Ba_m Ca_n)_2(Nb_{5-x}A_x)O_{15}$ shown in Table 5 in which a part of the Sr site of the main component of Example 2 was substituted with Ba and/or Ca. The monolithic ceramic capacitors were evaluated as in Example 4 to examine the effect of the amount m of substitution of Ba and/or the amount n of substitution of Ca in the dielectric ceramic compositions of Example 2. In Table 5, samples marked with * are those that are out of the range of the present invention.

(1) Preparation of Dielectric Ceramic Raw Materials

In this example, powders of $K_2CO_3$, $SrCO_3$, $BaCO_3$, $CaCO_3$ and $Nb_2O_5$ were prepared as starting materials for forming a main component $K(Sr_{1-m-n}Ba_m Ca_n)_2Nb_5O_{15}$. In addition, powders of $MnCO_3$, $Cr_2O_3$, $CoCO_3$, $Fe_2O_3$, $NiO$, $ZnO$, $MgCO_3$ and $SiO_2$ used as starting materials of an auxiliary component A for substituting a part of Nb of the main component were prepared. The starting materials of the main component and the starting materials of the auxiliary component A were weighed and mixed so that the mixed powders had the mixing ratios of sample Nos. 128 to 139 shown in Table 5. Thus, mixed powders were prepared. Each of the mixed powders was calcined in air at 1,100° C. for two hours and then pulverized to prepare calcined powders.

(2) Preparation of Samples

Subsequently, as in Example 2, a polyvinyl butyral binder and an organic solvent such as ethanol were added to each of the calcined powders for preparing sample Nos. 128 to 139. Each of the mixtures was wet-blended with a ball mill to prepare a ceramic slurry. Each of the ceramic slurries of sample Nos. 128 to 139 was formed into sheets by the doctor blade method to prepare rectangular ceramic green sheets each having a thickness of 8 μm. A conductive paste containing Ni as a main component was printed on each of the ceramic green sheets for each sample to form a conductive paste film for an inner electrode.

Subsequently, monolithic ceramic capacitors of sample Nos. 128 to 139 were produced as in Example 2 using the ceramic green sheets for each sample. The outer dimensions of each of the monolithic ceramic capacitors were the same as those of Example 2. Specifically, the width was 3.2 mm, the length was 4.5 mm, the thickness was 0.5 mm and the thickness of each dielectric ceramic layer disposed between the inner electrodes was about 6 μm. The number of effective dielectric ceramic layers was 5, and the area of opposed electrodes per layer was $2.5×10^{-6}$ m$^2$.

(3) Evaluation of Samples

The relative dielectric constant $\in_r$, the dielectric loss, and the resistivity ρ of each sample were calculated as in Example 4. The results are shown in Table 5.

TABLE 5

Main component: $K(Sr_{1-m-n}Ba_mCa_n)_2(Nb_{5-x}A_x)O_{15}$
$0 < m \leq 0.5, 0 < n \leq 0.5, 0 < m + n \leq 0.7, 0.05 \leq x \leq 1.0$

| No. | m | ž | \multicolumn{8}{c|}{Amount (x) of substitution of A for Nb} | Sintering temperature [° C.] | Relative dielectric constant εr | Dielectric loss D.F.[%] | Specific resistance Log ρ at 25° C. Ωm | Specific resistance Log ρ at 180° C. Ωm |
| --- | --- | --- | --- | --- | --- | --- | --- | --- | --- | --- | --- | --- | --- | --- | --- |
| | | | Mn | Cr | Co | Fe | Ni | Zn | Mg | Si | | | | | |
| 128 | 0.1 | 0.1 | 0.01 | — | — | 0.025 | — | — | 0.03 | — | 1100 | 2300 | 8 | 9.0 | 5.8 |
| 129 | 0.1 | 0.1 | 0.025 | — | — | 0.05 | — | 0.05 | — | 0.03 | 1100 | 2300 | 8 | 10.2 | 6.6 |
| 130 | 0.3 | 0.3 | 0.025 | 0.25 | 0.25 | — | — | — | — | — | 1100 | 1700 | 5 | 11.8 | 7.6 |
| 131 | 0.2 | 0.4 | 0.025 | — | — | — | 0.5 | 0.25 | — | — | 1075 | 1800 | 6 | 11.7 | 7.5 |
| *132 | 0.3 | 0.4 | 0.05 | 0.75 | — | — | — | — | — | 0.25 | 1100 | 1800 | 35 | 7.2 | Could not be measured. |
| 133 | 0.1 | 0.1 | 0.25 | — | 0.025 | — | — | — | 0.03 | — | 1125 | 2300 | 9 | 10.2 | 6.6 |
| 134 | 0.3 | 0.3 | 0.25 | — | — | 0.05 | 0.05 | — | — | 0.05 | 1125 | 1400 | 4 | 11.9 | 7.7 |
| 135 | 0.3 | 0.3 | 0.5 | — | — | — | 0.1 | — | 0.1 | — | 1125 | 1500 | 4 | 12.0 | 7.8 |
| 136 | 0.2 | 0.4 | 0.25 | 0.25 | 0.25 | — | — | 0.05 | — | — | 1125 | 1800 | 7 | 11.8 | 7.6 |
| 137 | 0.1 | 0.1 | 0.75 | 0.025 | — | — | — | — | — | 0.03 | 1125 | 2600 | 9 | 10.0 | 6.5 |
| 138 | 0.3 | 0.3 | 0.75 | — | — | 0.05 | 0.05 | — | — | — | 1125 | 1800 | 6 | 11.7 | 7.5 |
| *139 | 0.3 | 0.5 | 0.75 | — | — | 0.05 | — | — | — | — | Could not be sintered. | — | — | — | — |

Referring to the results in Table 5, sample Nos. 128 to 131 and Nos. 133 to 138 in which the amount x of substitution of the auxiliary component A such as Mn for Nb was within the range of the present invention, and the amount m of substitution of Ba and the amount n of substitution of Ca were within the range of the present invention, had a high resistivity ρ at a high temperature of 180° C., although the relative dielectric constants $\in_r$ of these samples were somewhat lower than those in Example 2. Furthermore, the same advantages as those in Example 2 were obtained.

In contrast, in sample No. 132 in which the amount x of substitution of the auxiliary component A such as Mn exceeded the range of the present invention and exceeded the total (m+n) of the amounts of substitution of Ba and Ca, the dielectric loss was high, more than 30%, the resistivity at 25° C. was low, and the resistivity ρ at 180° C. could not be measured. Sample No. 139 in which the total of the amount m of substitution of Ba and the amount n of substitution of Ca exceeded the range of the present invention (0<m+n≦0.7) could not be sintered as dielectric ceramic layers though the amount x of substitution of the auxiliary component A such as Mn was within the range of the present invention.

Example 6

In this example, monolithic ceramic capacitors were produced as in Example 3 using, instead of the main component $(K_{1-y}Na_y)Sr_2(Nb_{5-x}A_x)O_{15}$ of Example 3, dielectric ceramic compositions $(K_{1-y}Na_y)(Sr_{1-m-n}Ba_{m\ Can})_2(Nb_{5-x}A_x)O_{15}$ shown in Table 6 in which a part of the Sr site of the main component of Example 3 was substituted with Ba and/or Ca. The monolithic ceramic capacitors were evaluated as in Examples 4 and 5 to examine the effect of the amount m of substitution of Ba and/or the amount n of substitution of Ca of the main component in the dielectric ceramic compositions of Example 3. In Table 6, samples marked with * are those that are out of the range of the present invention.

(1) Preparation of Dielectric Ceramic Raw Materials

In this example, powders of $K_2CO_3$, $SrCO_3$, $BaCO_3$, $CaCO_3$, $Nb_2O_5$ and $Na_2CO_3$ were prepared as starting materials for forming a main component $(K_{1-y}Na_y)(Sr_{1-m-n}Ba_{m\ Can})_2Nb_5O_{15}$ In addition, a powder of $MnCO_3$ used as a starting material of the auxiliary component Mn for substituting a part of Nb of the main component was prepared. The starting materials of the main component and the starting material of the auxiliary component were weighed and mixed so that the mixed powders had the mixing ratios of sample Nos. 140 to 148 shown in Table 6. Thus, mixed powders were prepared. In sample Nos. 140 to 148, each of the amount m of substitution of Ba and the amount n of substitution of Ca was set to 0.1. Each of the mixed powders was calcined in air at 1,100° C. for two hours and then pulverized to prepare calcined powders.

(2) Preparation of Samples

Subsequently, a polyvinyl butyral binder and an organic solvent such as ethanol were added to each of the calcined powders for preparing sample Nos. 140 to 148. Each of the mixtures was wet-blended with a ball mill to prepare a ceramic slurry. Each of the ceramic slurries of sample Nos. 140 to 148 was formed into sheets by the doctor blade method to prepare rectangular ceramic green sheets each having a thickness of 8 μm. A conductive paste containing Ni as a main component was printed on each of the ceramic green sheets for each sample to form a conductive paste film for an inner electrode.

Subsequently, monolithic ceramic capacitors of the samples were produced as in Example 3 using the ceramic green sheets for each sample. The outer dimensions of each of the monolithic ceramic capacitors were the same as those of Example 3. Specifically, the width was 3.2 mm, the length was 4.5 mm, the thickness was 0.5 mm and the thickness of each dielectric ceramic layer disposed between the inner electrodes was about 6 μm. The number of effective dielectric ceramic layers was 5, and the area of opposed electrodes per layer was $2.5 \times 10^{-6}$ m$^2$.

(3) Evaluation of Samples

The relative dielectric constant $\in_r$, the dielectric loss and the resistivity ρ of each sample were calculated as in Examples 4 and 5. The results are shown in Table 6.

TABLE 6

Main component: $(K_{1-y}Na_y)(Sr_{1-m-n}Ba_mCa_n)_2(Nb_{5-x}A_x)O_{15}$
0 < m ≦ 0.5, 0 < n ≦ 0.5, 0 < m + n ≦ 0.7, 0.05 ≦ x ≦ 1.0, 0 ≦ y < 0.2

| No. | m | n | y | Amount (x) of substitution of A for Nb | | | | | | | | Sintering temperature [° C.] | Relative dielectric constant εr | Dielectric loss D.F.[%] | Specific resistance Log ρ at 25° C. Ωm | Specific resistance Log ρ at 180° C. Ωm |
|---|---|---|---|---|---|---|---|---|---|---|---|---|---|---|---|---|
| | | | | Mn | Cr | Co | Fe | Ni | Zn | Mg | Si | | | | | |
| 140 | 0.1 | 0.1 | 0.05 | 0.1 | — | — | — | — | — | — | — | 1100 | 2000 | 9.0 | 10.1 | 6.5 |
| 141 | 0.1 | 0.1 | 0.1 | 0.1 | — | — | — | — | — | — | — | 1100 | 1700 | 8.0 | 10.2 | 6.6 |
| 142 | 0.1 | 0.1 | 0.15 | 0.1 | — | — | — | — | — | — | — | 1075 | 1300 | 7.0 | 10.3 | 6.7 |
| 143 | 0.1 | 0.1 | 0.19 | 0.1 | — | — | — | — | — | — | — | 1100 | 1100 | 6.0 | 10.5 | 6.8 |
| *144 | 0.1 | 0.1 | 0.2 | 0.1 | — | — | — | — | — | — | — | 1125 | 900 | 4.0 | 10.7 | 6.9 |
| 145 | 0.1 | 0.1 | 0.15 | 0.25 | — | — | — | — | — | — | — | 1125 | 1400 | 8.0 | 10.2 | 6.6 |
| 146 | 0.1 | 0.1 | 0.15 | 0.75 | — | — | — | — | — | — | — | 1125 | 1400 | 8.0 | 10.2 | 6.6 |
| *147 | 0.1 | 0.1 | 0.3 | 0.25 | — | — | — | — | — | — | — | 1125 | 600 | 4.0 | 10.6 | 6.9 |
| *148 | 0.1 | 0.1 | 0.5 | 0.75 | — | — | — | — | — | — | — | 1125 | 500 | 3.0 | 10.8 | 7.0 |

Referring to the results shown in Table 6, sample Nos. 140 to 143 and Nos. 145 and 146 in which the amount x of substitution of Mn for Nb and the amount y of substitution of Na were within the range of the present invention, and the amount m of substitution of Ba, the amount n of substitution of Ca, and the total (m+n) of these amounts were also within the range of the present invention, although the relative dielectric constants $\in_r$ of the samples were lower than those in Example 3, had high resistivity ρ at a high temperature of 180° C., and thus reliability under a working condition at high temperatures was improved. Furthermore, the same advantages as those in Example 3 were obtained.

In contrast, sample Nos. 144, 147, and 148 in which the amount y of substitution of Na exceeded the range of the present invention had low relative dielectric constants $\in_r$ of less than 1,000, even though the amount m of substitution of Ba, the amount n of substitution of Ca, and the total (m+n) of these amounts were within the range of the present invention. These results showed that the presence of Na impaired the effect of the addition of Mn.

The present invention is not limited to the above examples. The present invention includes any dielectric ceramic composition containing, as a main component, a tungsten-bronze-type composite oxide represented by a composition formula $(K_{1-y}Na_y)Sr_2Nb_5O_{15}$ (wherein $0 \leq y < 0.2$) or a composition formula $(K_{1-y}Na_y)(Sr_{1-m-n}Ba_m Ca_n)_2Nb_5O_{15}$ (wherein $0 \leq y < 0.2$, $0 < m \leq 0.5$, $0 < n \leq 0.5$, and $0 < m+n \leq 0.7$), wherein the dielectric ceramic composition contains, as an auxiliary component, at least Mn in an amount in the range of 0.1 to 40 parts by mole relative to 100 parts by mole of the main component. In addition, the present invention includes any monolithic ceramic capacitor including the dielectric ceramic composition of the present invention.

INDUSTRIAL APPLICABILITY

The present invention can be suitably applied to a monolithic ceramic capacitor used as, for example, an electronic component or a component for automobile use.

The invention claimed is:

1. A dielectric ceramic composition comprising, as a main component, a tungsten-bronze-type composite oxide represented by a composition formula

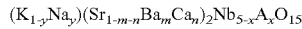

wherein $0 \leq y < 0.2$, $0 \leq m \leq 0.5$, $0 \leq n \leq 0.5$, $0 \leq m+n \leq 0.7$, $x \leq 1$, and A is at least one member selected from the group consisting of Mn, Cr, Co, Fe, Ni, Zn, Mg and Si, and, as an auxiliary component, Mn or Mn combined with A in a total amount in the range of 0.1 to 40 parts by mole relative to 100 parts by mole of the main component.

2. A dielectric ceramic composition according to claim 1 in which m and n are 0.

3. A dielectric ceramic composition according to claim 2 in which the auxiliary component is Mn.

4. A dielectric ceramic composition according to claim 2 in which the auxiliary component is Mn plus A.

5. A dielectric ceramic composition according to claim 2 in which x is 0.

6. A dielectric ceramic composition according to claim 2 in which x is greater than 0.

7. A dielectric ceramic composition according to claim 1 in which $0 < m \leq 0.5$, $0 < n \leq 0.5$, and $0 < m+n$.

8. A dielectric ceramic composition according to claim 7 in which the auxiliary component is Mn.

9. A dielectric ceramic composition according to claim 7 in which the auxiliary component is Mn plus A.

10. A dielectric ceramic composition according to claim 7 in which x is 0.

11. A dielectric ceramic composition according to claim 7 in which x is greater than 0.

12. A monolithic ceramic capacitor comprising a plurality of stacked dielectric ceramic layers; base metal inner electrodes disposed between dielectric ceramic layers; and outer electrodes that are electrically connected to the inner electrodes, wherein the dielectric ceramic layers are the dielectric ceramic composition according to claim 1.

13. A monolithic ceramic capacitor according to claim 12 in which the base metal comprises Ni.

14. A monolithic ceramic capacitor according to claim 12 in which m and n are 0.

15. A monolithic ceramic capacitor according to claim 14 in which the base metal comprises Ni.

16. A monolithic ceramic capacitor according to claim 14 in which the auxiliary component is Mn.

17. A monolithic ceramic capacitor according to claim 16 in which the base metal comprises Ni.

18. A monolithic ceramic capacitor according to claim 12 in which $0 < m \leq 0.5$, $0 < n \leq 0.5$, and $0 < m+n$.

19. A monolithic ceramic capacitor according to claim 18 in which the base metal comprises Ni.

20. A monolithic ceramic capacitor according to claim 18 in which the auxiliary component is Mn.

* * * * *